No. 872,386. PATENTED DEC. 3, 1907.
W. B. ST. JOHN.
ATTACHMENT FOR HARROW TEETH.
APPLICATION FILED APR. 24, 1907.
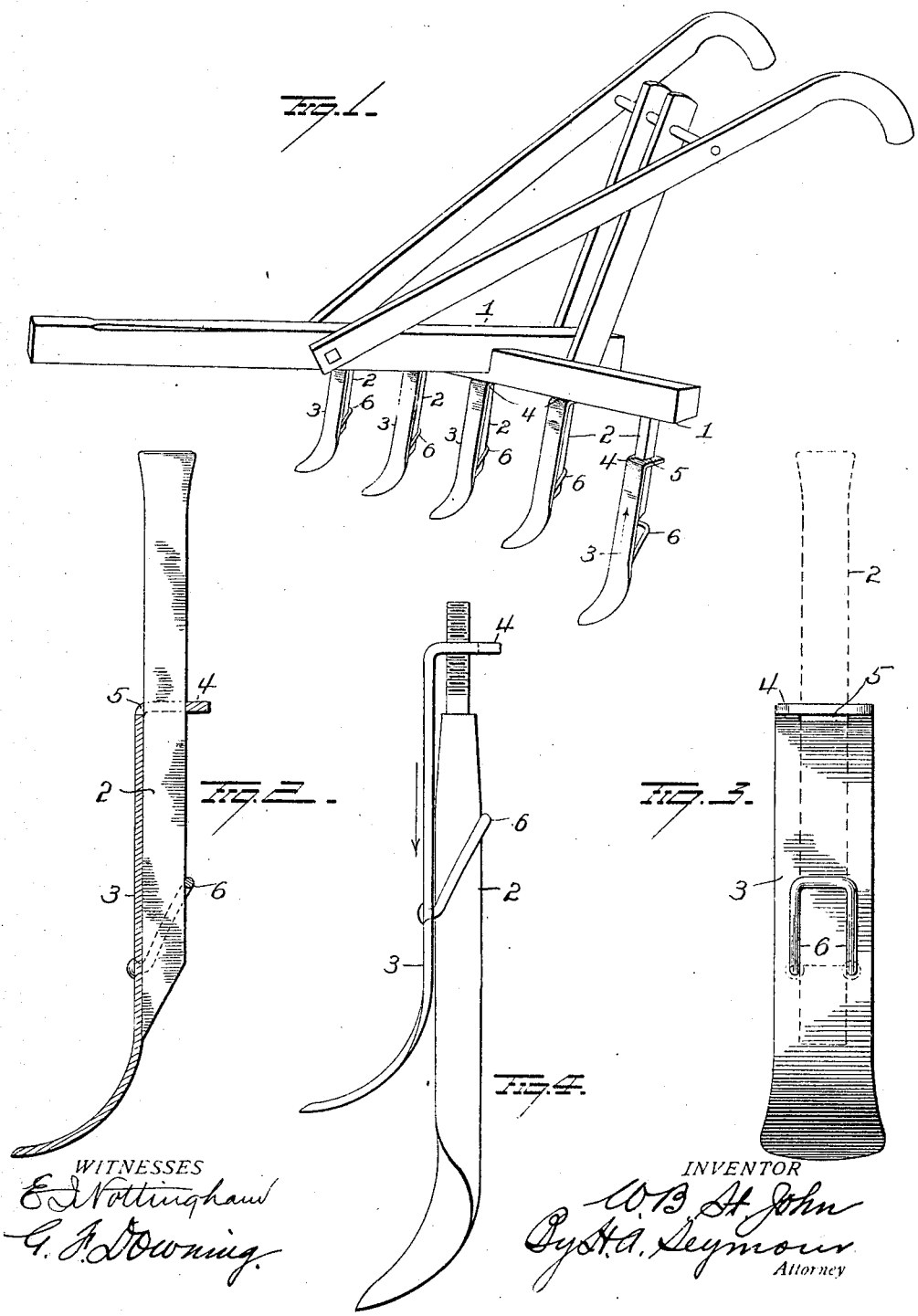
WITNESSES
INVENTOR
Attorney

UNITED STATES PATENT OFFICE.

WILLIAM B. ST. JOHN, OF NEW EDINBURG, ARKANSAS.

ATTACHMENT FOR HARROW-TEETH.

No. 872,386.   Specification of Letters Patent.   Patented Dec. 3, 1907.

Application filed April 24, 1907. Serial No. 370,039.

To all whom it may concern:

Be it known that I, WILLIAM B. ST. JOHN, of New Edinburg, in the county of Cleveland and State of Arkansas, have invented certain new and useful Improvements in Attachments for Harrow-Teeth; and I do hereby declare the following to be a full, clear, and exact description of the invention, such as will enable others skilled in the art to which it appertains to make and use the same.

My invention relates to an improved attachment for converting a harrow tooth into a cultivator tooth, the object being to provide a cheap and simple attachment that can be readily and quickly slipped over the free or cutting end of a harrow tooth and cover the front face of the tooth, thus converting the harrow tooth into a cultivator tooth.

With this end in view my invention consists in a cultivator tooth having a shouldered upper end with an opening through the shoulder for the passage of the harrow tooth, and a clamp on the rear face of the cultivator tooth for engaging the harrow tooth, whereby the detachable cultivator tooth is held in position on the harrow tooth.

In the accompanying drawings Figure 1 is a view of a harrow showing my improvement applied thereto; Fig. 2 is a vertical section through a harrow tooth faced with the cultivator tooth, and Fig. 3 is a view of the latter detached.

1 represents a harrow frame which may be of any construction, and 2 are rigid non-yielding teeth of same.

3 represents my attachment which is in the shape of a cultivator tooth with a shank, and is preferably slightly longer than the projecting portion of a harrow tooth, so that when applied to the latter it will bear at its upper end against the underside of the frame of the harrow and project slightly below the cutting end of the tooth. The upper end of the tooth is bent abruptly rearwardly forming a shoulder 4 at right angles to the body. This shoulder 4 is adapted to bear against the under face of the frame 1 and is provided with an opening 5 shaped to conform to the shape and size of the cross section of the harrow tooth 2, so that when applied to the latter, the tooth 3 cannot turn on the tooth 2.

Projecting from the rear face of tooth 3 is the spring clip 6. This clip is in the form of an oblong loop projecting upwardly and rearwardly and is adapted to receive the harrow tooth 2, and when in engagement with the latter, rests in an inclined position, and bears with sufficient force and friction against the harrow tooth 2, to hold the tooth 3 against displacement on tooth 2.

The teeth 3 are applied to the teeth 2 from the lower free ends of the latter, the teeth 2 passing through the openings in shoulders 5 and through the spring clips 6, and when in position, the shoulders 4 rest against the underside of the frame of the harrow. To remove the attachment, it is simply necessary to apply pressure to the upper end of the upwardly and rearwardly inclined spring clips 6, which tends to remove the rear bar of the clip from contact with the rear face of tooth 2, and at the same time push tooth 3 off the harrow tooth.

In cases where the harrow teeth are flattened or made wider at their lower ends than at their upper ends, they are usually secured to the harrow frame by nuts engaging upper threaded ends of the harrow teeth, as shown in Fig. 4. In such cases my improvement can be applied by disconnecting the harrow teeth 2 from the frame of the harrow and passing the upper ends of teeth 2 first through the spring clips and then through the openings 5 in shoulders 4. After the attachments have been secured to the teeth 2, the latter are then secured to the harrow frame.

With my improvement an ordinary harrow can be readily and quickly converted into a cultivator without the use of any tools and without the employment of skilled labor. The attachments can be made in various sizes to suit the standard sizes of harrow, and can be made of various shapes.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. A tooth provided at its upper end with a shoulder having an opening therein, and a spring clamp secured to the tooth intermediate of its ends and projecting rearwardly therefrom.

2. A tooth provided at its upper end with a shoulder having an opening, and a spring clamp secured to the tooth intermediate the ends of the latter, said spring clamp projecting rearwardly and upwardly from its connection with the tooth.

3. The combination with a harrow frame and a harrow tooth secured thereto, of a detachable tooth adapted for attachment to the harrow tooth, and having a shouldered upper end which rests in contact with the underside of the harrow frame, the said shoulder having an opening for the passage of the harrow tooth and a spring clamp on the rear face of the detachable tooth adapted to engage the harrow tooth.

4. The combination with a harrow frame and a harrow tooth secured thereto, of a detachable tooth adapted for attachment to the harrow tooth and having a shouldered upper end which rests in contact with the underside of the harrow frame, the said shoulder having an opening for the passage of the harrow tooth, and a loop shaped spring metal clamp secured to the rear face of the detachable tooth and projecting upwardly and rearwardly therefrom.

In testimony whereof, I have signed this specification in the presence of two subscribing witnesses.

WILLIAM B. ST. JOHN

Witnesses:
C. F. SMITH,
J. O. ROSS.